United States Patent
Dhana Sekaran et al.

(10) Patent No.: US 10,311,310 B2
(45) Date of Patent: Jun. 4, 2019

(54) METHOD AND APPARATUS FOR PROVIDING INCREASED OBSTACLE VISIBILITY

(71) Applicant: Conti Temic microelectronic GmbH, Nürnberg (DE)

(72) Inventors: Sudhan Dhana Sekaran, Kronach (DE); Markus Friebe, Gefrees (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 3 days.

(21) Appl. No.: 15/613,929

(22) Filed: Jun. 5, 2017

(65) Prior Publication Data

US 2017/0270371 A1 Sep. 21, 2017

Related U.S. Application Data

(63) Continuation of application No. PCT/EP2015/076285, filed on Nov. 11, 2015.

(30) Foreign Application Priority Data

Dec. 4, 2014 (EP) ..................................... 14196327

(51) Int. Cl.
  *G06K 9/00* (2006.01)
  *G06K 9/20* (2006.01)
  *G06K 9/62* (2006.01)

(52) U.S. Cl.
  CPC ..... *G06K 9/00791* (2013.01); *G06K 9/00805* (2013.01); *G06K 9/209* (2013.01); *G06K 9/629* (2013.01); *G06K 9/6289* (2013.01)

(58) Field of Classification Search
  None
  See application file for complete search history.

(56) References Cited

U.S. PATENT DOCUMENTS

2008/0043113 A1* 2/2008 Ishii ..................... G06T 3/4038
                                                     348/218.1
2011/0157361 A1  6/2011 Wu et al.
2012/0121136 A1  5/2012 Gloger et al.

FOREIGN PATENT DOCUMENTS

DE       102006010295 A1   9/2007

OTHER PUBLICATIONS

European Search Report dated May 19, 2015 from corresponding EP Patent Application No. 14196327.2.
Communication from the European Patent Office dated Oct. 4, 2017 from corresponding EP Patent Application No. 14196327.2.

* cited by examiner

*Primary Examiner* — Delomia L Gilliard

(57) ABSTRACT

A surround view system includes at least at least one camera pair formed by two cameras with overlapping fields of view adapted to generate camera images with an overlapping area. The system also includes and a processing unit configured to compute surround view images including overlapping areas with respect to each camera and to extract features from the computed surround view images resulting in binary images for each overlapping area. Priority in visualization is given to the camera image of the overlapping area generated by the camera of the respective camera pair where a calculated sum of binary values within the resulting binary image is highest.

9 Claims, 4 Drawing Sheets

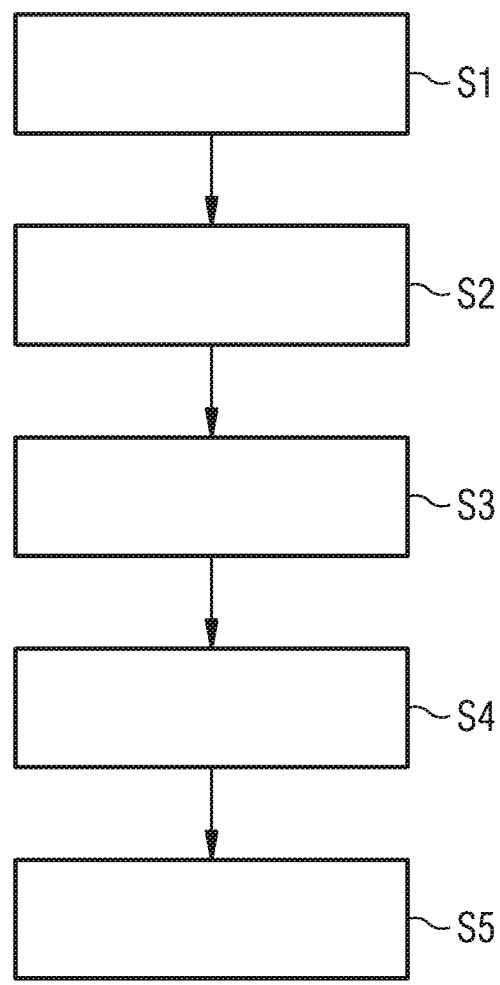

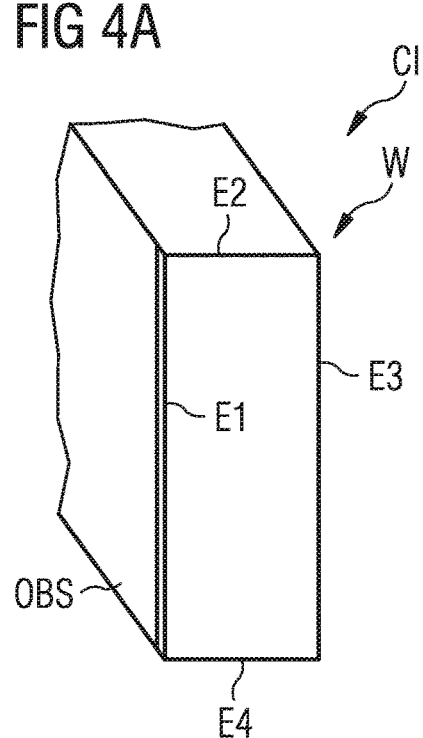

METHOD AND APPARATUS FOR PROVIDING INCREASED OBSTACLE VISIBILITY

CROSS REFERENCE TO RELATED APPLICATION

This application claims the benefit of International application No. PCT/EP2015/076285, filed Nov. 11, 2015, which claims the benefit of European patent application No. 14196327.2, filed Dec. 4, 2014, each of which are hereby incorporated by reference herein.

TECHNICAL FIELD

The technical field relates generally to a driver assistance system and particularly to a driver assistance system for providing visibility of obstacles in the vicinity of a vehicle.

BACKGROUND

A driver assistance system is used in a vehicle to assist a driver in performing driving maneuvers, in particular parking maneuvers. A conventional driver assistance system can comprise a surround view system having cameras adapted to capture camera images of the vehicle's surrounding to generate a surround view. The generated surround view image can be displayed on a display to the driver during a driving maneuver. With a surround view system, a top view may be rendered from multiple camera images. The surround view system can comprise several cameras, wherein adjacent cameras can have an overlapping field of view ("FOV"). Conventional surround view systems may result in poor obstacle visibility of obstacles in the overlapping areas. However, if obstacles located in the overlapping areas are only poorly visible by a surround view system, this may lead to insufficient safety functions of the driver assistance system using the AOP view generated by the surround view system.

Accordingly, it is desirable to provide a method and apparatus which provide an increased obstacle visibility of obstacles in overlapping areas. In addition, other desirable features and characteristics will become apparent from the subsequent summary and detailed description, and the appended claims, taken in conjunction with the accompanying drawings and this background.

BRIEF SUMMARY

In one exemplary embodiment, a surround view system includes at least one camera pair formed by two cameras with overlapping fields of view adapted to generate camera images with an overlapping area. The system also includes a processing unit configured to compute surround view images including overlapping areas with respect to each camera and to extract features from the computed surround view images resulting in two binary images for each overlapping area, wherein priority in visualization is given to the camera image of the overlapping area generated by the camera of the respective camera pair where a calculated sum of the binary values within the resulting binary image is highest.

In a possible embodiment of the surround view system, the camera image of the overlapping area generated by the camera of the camera pair resulting in the binary image with the highest sum of binary values is selected by the processing unit for visualization.

In a still further possible embodiment of the surround view system, the camera images generated by a camera of the pair of cameras selected by the processing unit are displayed on a display.

In a still further possible embodiment of the surround view system, the field of view of each camera is more than 180 degrees.

In a still further possible embodiment of the surround view system, the processing unit is adapted to calculate the surround view images in real time from camera images captured by the cameras of the surround view system.

In a possible embodiment of the surround view system, the surround view system comprises at least four vehicle cameras mounted at different sides of a vehicle's chassis.

In one exemplary embodiment, a driver assistance system of a vehicle may include a surround view system. The surround view system includes at least one camera pair formed by two cameras with overlapping fields of view adapted to generate camera images with an overlapping area. The surround view system may also include a processing unit configured to compute surround view images including overlapping areas with respect to each camera. The processing unit may also be configured to extract features from the computed surround view images resulting in two binary images for each overlapping area. Priority in visualization is given to the camera image of the overlapping area generated by the camera of the respective camera pair where a calculated sum of the binary values within the resulting binary image is highest.

In one exemplary embodiment, a surveillance system includes a surround view system. The surround view system includes at least one camera pair formed by two cameras with overlapping fields of view adapted to generate camera images with an overlapping area. The surround view system may also include a processing unit configured to compute surround view images including overlapping areas with respect to each camera. The processing unit may also be configured to extract features from the computed surround view images resulting in two binary images for each overlapping area. Priority in visualization is given to the camera image of the overlapping area generated by the camera of the respective camera pair where a calculated sum of the binary values within the resulting binary image is highest.

In one exemplary embodiment, a medical apparatus includes a surround view system. The surround view system includes at least one camera pair formed by two cameras with overlapping fields of view adapted to generate camera images with an overlapping area. The surround view system may also include a processing unit configured to compute surround view images including overlapping areas with respect to each camera. The processing unit may also be configured to extract features from the computed surround view images resulting in two binary images for each overlapping area. Priority in visualization is given to the camera image of the overlapping area generated by the camera of the respective camera pair where a calculated sum of the binary values within the resulting binary image is highest.

In one exemplary embodiment, a method for providing increased obstacle visibility comprises generating camera images with overlapping areas by at least one pair of cameras formed by two cameras with overlapping fields of view. The method also includes computing surround view images including the overlapping areas on the basis of the generated camera images. The method further includes extracting features from the computed surround view image resulting in binary images for each overlapping area. The method also includes summing up the binary values within the binary images and comparing the calculated sums with each other. The method further includes displaying the computed surround view image, wherein in each included overlapping area priority in visualization is given to the camera image resulting in the binary image having the highest calculated sum of binary values.

In a possible embodiment of the method, the camera image of the overlapping area generated by the camera of the camera pair resulting in the binary image with the highest sum of binary values is selected from the camera images for visualization.

In a possible embodiment of the method, the method steps are performed in real time.

In a possible embodiment, a computer program having instructions adapted to perform the method steps of the method is presented. An image processing tool comprising the computer program is also presented. A data carrier which stores a computer program is also presented.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 3 a flowchart illustrating a possible exemplary embodiment of a method for providing increased obstacle visibility; and FIGS. 4A and 4B are diagrams for illustrating operation of exemplary embodiments of the surround view system and method for providing increased obstacle visibility.

DETAILED DESCRIPTION

Figure 1:
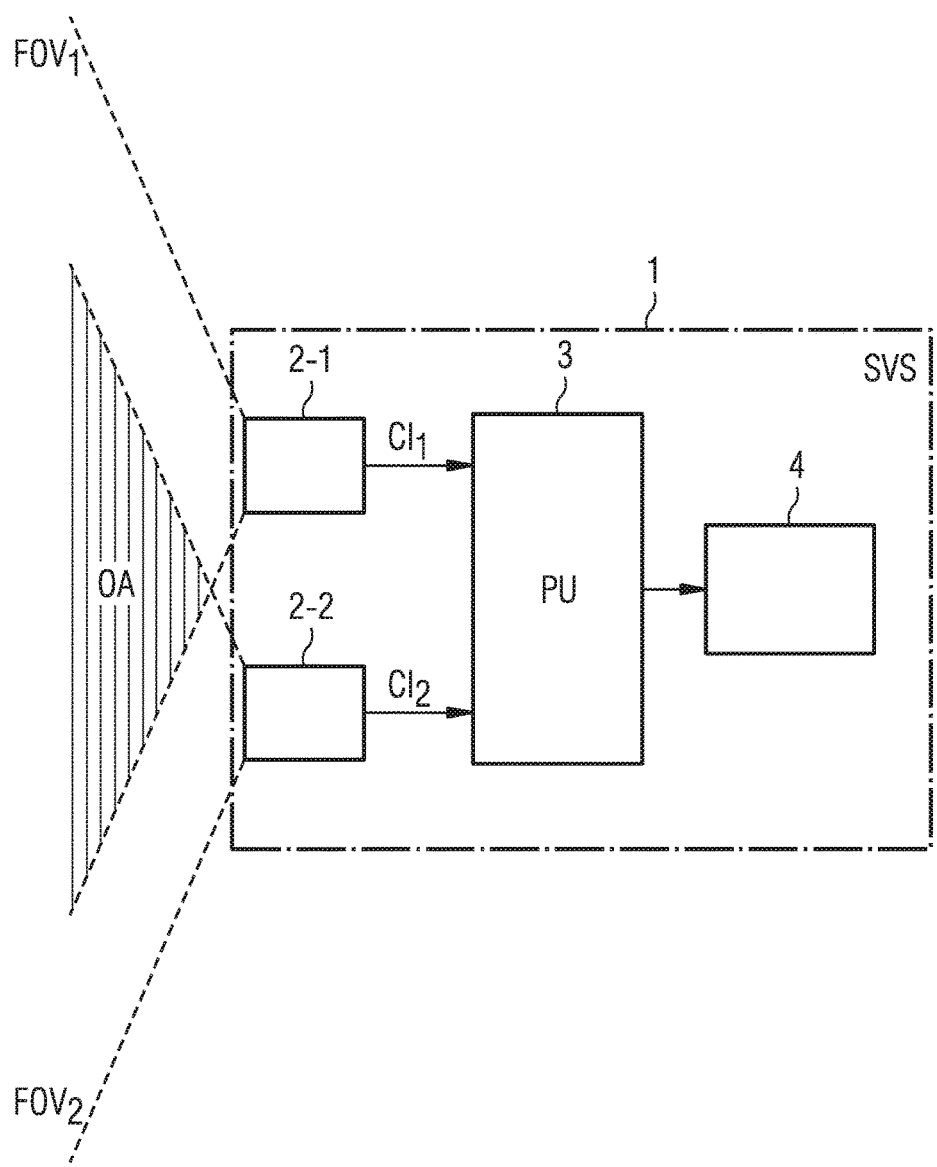
FIG. 1 is a block diagram for illustrating a possible exemplary embodiment of the surround view system.

As can be seen in FIG. 1, a surround view system 1 according to one exemplary embodiment includes at least one camera pair formed by two cameras 2-1, 2-2 with overlapping fields of view FOV adapted to generate camera images CI with an overlapping area OA. In a possible embodiment, the field of view FOV of each camera 2-i is more than 180 degrees. In a possible embodiment, the cameras 2-1, 2-2 can be formed by so-called fisheye cameras mounted on a chassis of a vehicle.

The cameras 2-1, 2-2 are connected to a processing unit 3 which may include at least one microprocessor. The processing unit 3 is configured to compute surround view images including overlapping areas OAs with respect to each camera and to extract features from the computed surround view images resulting in at least two binary images BI for each overlapping area OA. The binary images BI calculated by the processing unit 3 can be stored temporarily in a buffer memory of the processing unit 3. When visualizing the surround view image, priority is given to the camera image CI of the overlapping area OA generated by the camera of the respective camera pair where a calculated sum of the binary values within the resulting binary image BI is higher. In the exemplary system illustrated in FIG. 1, the first camera 2-1 of the camera pair generates a first camera image $CI_1$ and the second camera 2-2 of the camera pair generates a second camera image $CI_2$. The processing unit 3 computes top view images for the overlapping regions with respect to each camera. In a possible embodiment, the processing unit 3 comprises an edge detector or feature detector adapted to compute edges or features for all images resulting in two binary images BI for each overlapping area OA. The processing unit 3 gives priority in visualization to the particular camera in its overlapping area OA where the sum of the binary values within the resulting binary image BI is higher. In a possible embodiment, the camera image CI of the overlapping area OA generated by the camera of said camera pair resulting in the binary image BI with the highest calculated sum of binary values is selected by the processing unit 3 for visualization and output to a display 4 of the surround view system 1. In a possible embodiment, the processing unit 3 of the surround view system 1 is adapted to calculate the surround view images in real time from the camera images CI captured by the cameras 2-i of the surround view system 1. The number of cameras 2-i adapted to capture camera images CI can vary.

Figure 2:
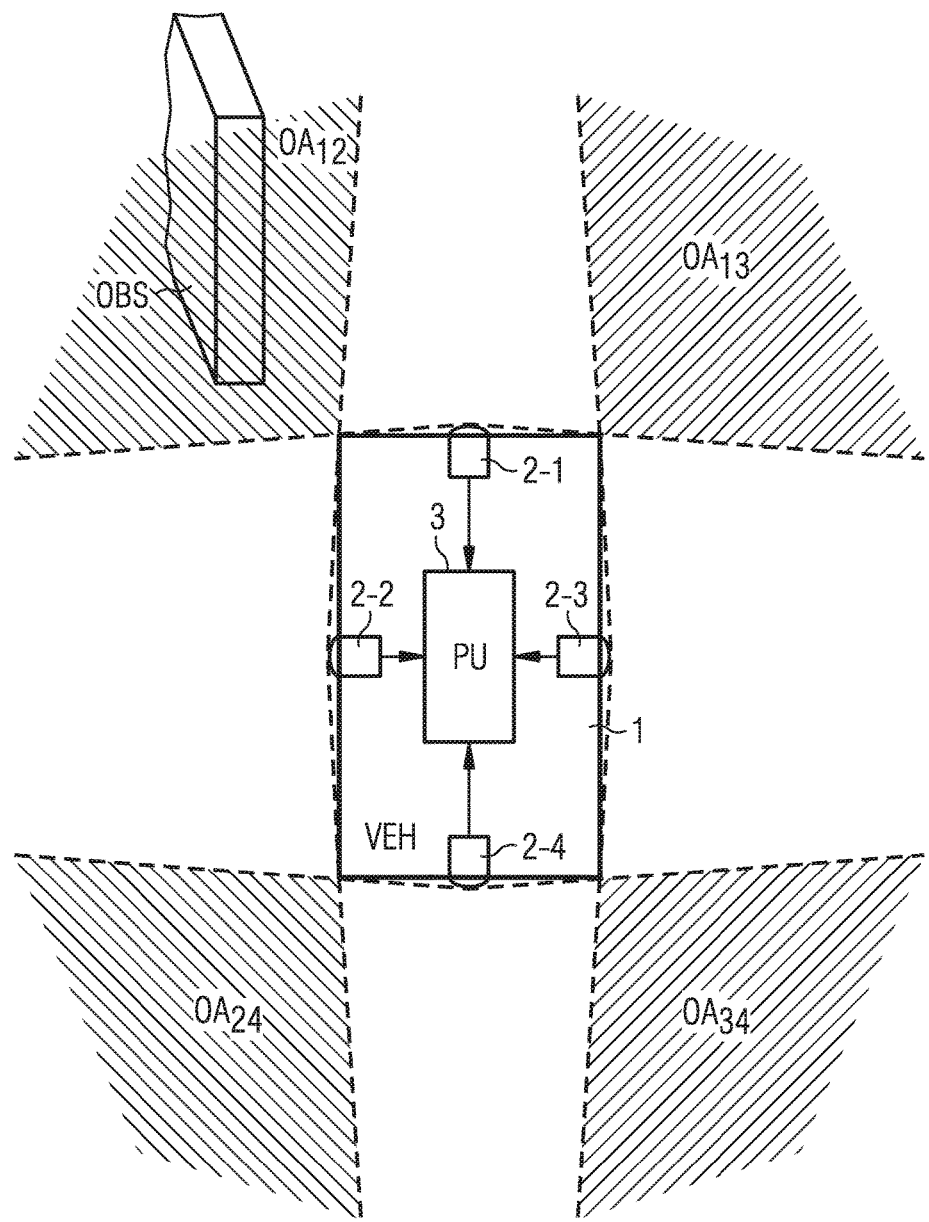
FIG. 2 is a possible exemplary embodiment of a surround view system.

FIG. 2 shows schematically a vehicle VEH including the surround view system 1 as illustrated in FIG. 1. The vehicle VEH and the surround view system 1 of this illustrated embodiment includes four cameras 2-1, 2-2, 2-3, 2-4 positioned at different sides of the vehicle's chassis. Each camera 2-i includes in the illustrated embodiment a field of view FOV of more than 180 degrees. The illustrated vehicle VEH can be any kind of vehicle such as a car, bus, or truck performing a driving maneuver which can be assisted by a driver assistance system having an integrated surround view system 1 as illustrated in FIG. 1. The four vehicle cameras 2-1, 2-2, 2-3, 2-4 are mounted at different sides of the vehicle's chassis so that four different overlapping areas OAs are visible to the vehicle cameras 2-i as shown in FIG. 2. For example, in the front left corner of the vehicle's chassis, there is an overlapping area OA12 in the camera images CI captured by the front camera 2-1 and the left camera 2-2 of the surround view system 1 of the vehicle VEH. In FIG. 2, the overlapping area OA12 comprises an obstacle OBS. The obstacle OBS is in the illustrated example a wall of a garage in which the driver of vehicle VEH wishes to maneuver the vehicle VEH. This obstacle OBS is also illustrated in FIG. 4A illustrating the front face of a wall W of a vehicle garage. As can be seen in FIG. 4A, the front of the garage wall W comprises four edges E1, E2, E3, E4. These edges Ei are represented in the binary image BI shown in FIG. 4B with logical high binary values 1. In the surround view system 1 according to the first aspect of the present invention, priority in visualization is given to the camera image CI of the overlapping area OA generated by the camera of the respective camera pair where the sum of the binary values within the resulting binary image is highest. In a possible embodiment, two different binary images BI such as illustrated in FIG. 4B generated by two cameras such as cameras 2-1, 2-2 as shown in FIG. 2 are evaluated in real time to detect which camera image CI makes the obstacle OBS better visible. In a possible embodiment, the binary values of the corresponding binary image BI are summed up to calculate its summation value reflecting for instance the visibility of the edges E1, E2, E3, E4 of the obstacle wall W of the garage schematically shown in FIG. 4A. A high summed up value indicates that the edges Ei of the obstacle OBS are highly visible and the camera image CI corresponding with the binary image BI with the highest sum of binary values is automatically selected by the processing unit 3 of the surround view system 1 for visualisation on the display 4. In the embodiment shown in FIG. 2 prioritization can be performed for example such that the camera image CI1 generated by the front camera 2-1 is selected for the overlapping area OA because the sum of the binary values of the corresponding binary image BI1 is higher than the sum of the binary values of the binary image BI2 corresponding to the camera image CI2 provided by the left camera 2-2 or vice versa.

FIG. 3 shows a flowchart of an exemplary embodiment of a method for providing increased obstacle visibility. In a first step S1, the camera images CI with overlapping areas are generated by at least one pair of cameras formed by two cameras with overlapping fields of view. In a further step S2, surround view images including the overlapping areas OAs are computed on the basis of the generated camera images. In a further step S3, features from the computed surround view images are extracted resulting in binary images BI for each overlapping area. These features can comprise edges Ei visible in the camera images. In a further step S4, the binary values within both binary images BI are summed up and the calculated sums are compared with each other. In another step S5, the computed surround view image is displayed, wherein in each included overlapping area OA priority in visualization is given to the camera image CI resulting in the binary image BI having the highest calculated sum of binary values.

In a possible embodiment, the overlapping area OA generated by the camera of the camera pair resulting in the binary image BI with the higher sum of binary values is selected automatically from the two cameras images CI for visualization on a display. In one possible embodiment, the steps as illustrated in FIG. 3 are performed in real time.

The method steps as shown in FIG. 3 can be performed by a computer program having instructions adapted to perform the method steps as shown in FIG. 3. This computer program can form part of an image processing tool. The computer program including the steps for performing the method steps of FIG. 3 may be stored on a data carrier. This data carrier may be inserted into a reading device of the surround view system 1 which reads out the stored computer program and stores the computer program in a program memory of the surround view system 1. In an alternative embodiment, the computer program may also be downloaded from a database. In a possible embodiment, the computer program may be downloaded from a server via a wireless link between the surround view system 1 and a base station connected to the server via a backbone network.

The surround view system 1 as illustrated in FIG. 1 may also be implemented in a possible embodiment in a surveillance system. This surveillance system may, for instance, be used to monitor a public area or rooms within a building.

The system 1 may also be integrated in a medical apparatus scanning, for instance, the body of a person.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A surround view system comprising:
   at least one camera pair formed by two cameras with overlapping fields of view adapted to generate camera images with an overlapping area; and
   a processing unit configured to compute surround view images including overlapping areas with respect to each camera and to extract at least one edge from the computed surround view images resulting in a pair of binary images for each overlapping area, wherein each edge is represented in each binary image with a logical binary value of 1;
   wherein priority in visualization is given to the camera image of the overlapping area, generated by the camera of the respective camera pair where a calculated sum of the binary values within the resulting binary image is highest of the calculated sums of binary values of the pair of binary images.

2. The surround view system according to claim 1, wherein the camera image of the overlapping area generated by the camera of said camera pair resulting in the binary image with the highest sum of binary values of the pair of binary images is selected by said processing unit for visualization.

3. The surround view system according to claim 2, wherein the camera images generated by a camera of said pair of cameras selected by the processing unit are displayed on a display.

4. The surround view system according to claim 1, wherein the field of view of each camera is greater than 180 degrees.

5. The surround view system according to claim 1, wherein the processing unit is adapted to calculate the surround view images in real time from camera images captured by the cameras.

6. The surround view system according to claim 1, wherein said surround view system comprises at least four vehicle cameras mounted at different sides of a vehicle's chassis.

7. A method for providing increased obstacle visibility comprising:
   generating camera images with overlapping areas by at least one pair of cameras formed by two cameras with overlapping fields of view;
   computing surround view images including the overlapping areas on the basis of the generated camera images;
   extracting edges from the computed surround view image resulting in a pair of binary images for each overlapping area where each edge is represented in each binary image with logical binary values of 1;
   summing up the binary values within the binary images and comparing the calculated sums with each other;
   displaying the computed surround view image, wherein in each included overlapping area priority in visualization is given to the camera image resulting in the binary image having the highest calculated sum of binary values of the calculated sums of binary values of the pair of binary images.

8. The method according to claim 7, further comprising selecting the camera image of the overlapping area generated by the camera of the camera pair resulting in the binary image with the higher calculated sum of binary values of the calculated sums of binary values of the pair of binary images from the two camera images for visualization.

9. The method according to claim 7, wherein the steps are performed in real time.

* * * * *